July 29, 1930. B. M. BOYD Re. 17,747

WEB ALIGNING AND TENSIONING DEVICE

Original Filed April 21, 1925 2 Sheets-Sheet 1

Inventor

Blanton M. Boyd

By Thornton Rogers

Attorney

July 29, 1930. B. M. BOYD Re. 17,747

WEB ALIGNING AND TENSIONING DEVICE

Original Filed April 21, 1925 2 Sheets-Sheet 2

Inventor

Blanton M. Boyd

By Thornton Rogers

Attorney

Reissued July 29, 1930 Re. 17,747

UNITED STATES PATENT OFFICE

BLANTON M. BOYD, OF CINCINNATI, OHIO, ASSIGNOR TO THE GLOBE REGISTER COMPANY, OF CINCINNATI, OHIO, A CORPORATION OF OHIO

WEB ALIGNING AND TENSIONING DEVICE

Original No. 1,610,599, dated December 14, 1926, Serial No. 24,885, filed April 21, 1925. Application for reissue filed May 12, 1927. Serial No. 190,941.

This invention is particularly intended for usage in connection with such machines as manifolding typewriters and the like and is designed with the object of producing a device in which perfect registration of a series of superposed form-printed webs may be obtained, together with the advantages to be obtained by a measured delivery feed in which all air pockets between adjacent webs are eliminated and in which perfect impression of the type is secured in printing the superposed forms. A further object lies in the elimination of web buckling and wrinkling as well as in the prevention thereby of all stencil cutting of the type in printing upon the superposed webs. An additional feature lies in the simultaneous provision of a means for cutting the attached printed forms from one another, as a part of the mechanism by means of which web alignment is secured simultaneously with the elimination of air pockets, web buckling, stencil cutting of the type, etc.

These and other objects are attained in the device described in the following specification and illustrated in the accompanying drawings, in which.

The embodiment of the invention has been chosen as having particular adaptation to a form of typewriter which is in common use and which employs a stationary platen over which a relatively movable typewriter printing mechanism moves during the writing operation.

However, the use of the invention need not be confined to any particular style of printing mechanism, to any of which it is readily adaptable, but may just as readily be used independently thereof, in which the mere use of hand writing will permit the invention to function to just as great an advantage.

Figure 4:
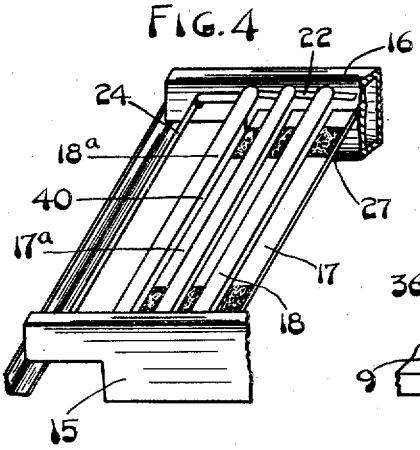
Fig. 4 is a fragmental perspective view of a portion of the apparatus shown in Fig. 2, the parts being shown in different positions.

A stand of well known design, has been employed to support the usual stationary platen 9 embodied in this style of stand. Over this platen the usual typewriter 10 operates, and between the platen and the writing mechanism a series of superposed webs of paper 11 are located. These webs are taken from a source of supply which consists of a suitably mounted roll 12 located beneath the platen. In order to provide for the passage of the webs from roll 12 onto the platen in a manner which constitutes an important feature of the invention, the frame which supports the platen is extended rearwardly as two supporting arms 13 and 14. Between these arms a roller carrying unit is mounted. This unit consists of two side bars 15 and 16 which carry a series of shutters or slats 17 which are rigidly attached to the side bars. Above these slats are located a series of rollers 18, one roller being located above each slat. Each end of each roller is located in a slot 22 located above each end of each slot, the slot being inclined upwardly from its rear to the front end as shown. The position of the rollers when at the rear of the slots is such that they rest upon the slats and when they are moved to the front of the slots they are lifted upwardly somewhat to clear the slats and at the same time move sufficiently far forward to lie materially away from or in spaced relation to the slat which cooperates with each one. In order to accomplish the movement of the rollers manually, there has been provided a sliding bar 19 within each of the side bars 15 and 16. This bar is provided with lugs 20 which extend upwardly back of the spindles 21 which journal the rollers in the slots 22. Upon each roller spindle a spring 23 is fastened, the opposite ends of the springs being located back of the spindles somewhat so as to bring about a tendency of the rollers to be held rearwardly yieldingly. Now, in order to bring about the forward movement of the rollers by creating a forward movement of each bar, a rod 24 has been provided. This rod is mounted for the sliding of its ends in L-shaped slots 25 in the side frames, while the ends of the bars 19 have short vertical slots 26 to receive the ends of the rod 24 in order to permit the rod to draw both bars forwardly and to lock them in this forward position pressing it downwardly in the slots 26 and the vertical portions of slots 25. Thus, when moved forwardly, the bars 19 will draw the rollers forwardly and hold them in this position free of the slats, as shown in Fig. 4. The slats 17 which cooperate with the rollers 18 are spaced apart as shown, and are each provided with a slightly raised and roughened spot 27 at each end so that the roller contacts with these spots only. The purpose of this will be explained later. In order to support the large roll of multiple wound web stationery 12, which constitutes the subject of application for United States Letters Patent serially numbered 740,869 and filed September 30, 1924, by Alphonse E. Imbus, a spindle supporting trapeze 28 has been provided. The spindle 29 of this trapeze supports the roll 12, while the trapeze is supported in turn from its upper bar 30 by means of hooks 31 on the under faces of the side bars 15 and 16.

At the forward edge of the web supporting platen two pins or hooks 32 and 33 are located, with their ends extending forwardly so that after the spaced apertures 34 of the webs are placed over these hooks they may be drawn backwardly without danger of them becoming disengaged therefrom, this backward movement being effected in the manner and for the purpose to be hereinafter described.

Figure 7:
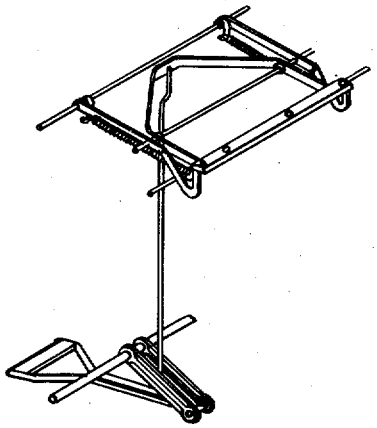
Fig. 7 is a somewhat diagrammatic view of the device employed for operating the cutting and alignment securing mechanism.
Figure 5:
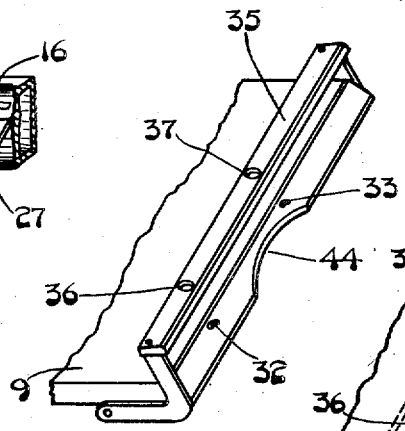
Figs. 5 and 6 are fragmental perspective views of the cutting and alignment securing mechanism in two positions.
Figure 6:
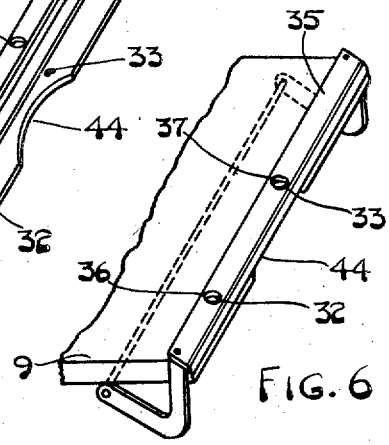

To aid in placing and retaining the web apertures upon the hooks 32 and 33 there has been provided an apertured tearing or cutting knife 35, the apertures 36 and 37 of which are so placed as to permit the knife to be brought down upon the platen with the hooks projecting through the apertures. This knife is fastened to arms which are pivoted as shown in Figs. 5, 6 and 7, so that it may be brought with its sharp edge down upon the forward edge of the platen, in clamping engagement with the webs thereon and in position to permit of their being torn off along this edge after one set of form printed web sections have been filled in and drawn forwardly from the platen to provide a fresh set on the platen. Operation of the knife is secured through the foot treadle 38 as shown in Fig. 7.

Figure 1:
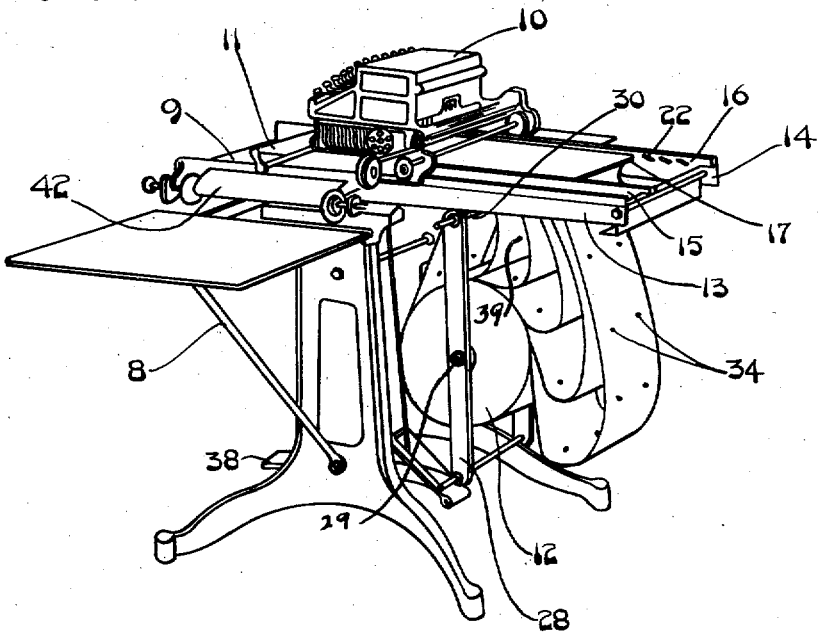
Fig. 1 is a perspective view of a device embodying the invention, in conjunction with a form of manifolding typewriter in common use.
Figure 8:
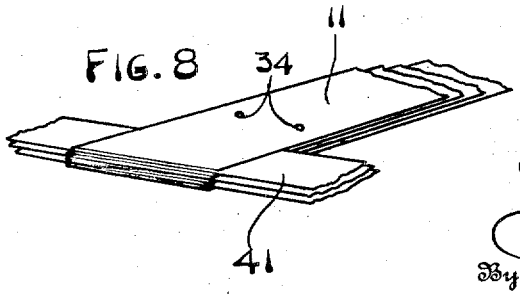
Fig. 8 is a small perspective view to illustrate the arrangement of the webs and interleaved carbon sheets as used in the invention.

In order to prepare the illustrated embodiment of the invention for operation the first thing necessary is to place the roll of stationery upon the trapeze spindle and to then hang the trapeze upon the hook 31, as shown in Fig. 1. The webs are then unrolled from the roll sufficiently to permit them to be passed over the platen. This is accomplished by first drawing the rollers 18 forwardly and locking them in this position by means of the rod 24. In this position the rollers have been brought to and held in the position shown in Fig. 4, in which a space is opened between each roller and its cooperating slat. The first web to be then placed upon the platen is the forwardmost web 39. This web is passed upwardly between the forwardmost roller 18[a] and the cooperating forwardmost shutter 17[a] through the space 40 which exists between them. The web is then brought forwardly over the roller and laid upon the platen with the apertures 34 at its end placed over the hooks 32 and 33, and beneath knife 35. Each succeeding web is then taken and passed between each succeeding cooperating roller and shutter and in turn is laid upon the preceding web which has been placed upon the platen after a strip of carbon paper 41, see Fig. 8, from a side positioned roll 42, see Fig. 1, has been placed upon the preceding platen-supported portion of each web, the apertures 34 in the end of each succeeding web being brought to engage the hooks 32 and 33. After all the webs have thus been placed in position, the rod 24 is pushed upwardly to release the rollers. This allows the springs 23 to carry the rollers to the rear and to carry with them the portion of the webs upon the platen until the slackness therein has been taken out to cause them to lie flat on the platen. Pulling of the rollers upon only the platen supported portions of the web is occasioned by reason of the web snubbing action which takes place between each roller and its cooperating shutter at the time when the roller has moved back far enough to grip the web between it and the shutter. This then locks that portion of the web which lies between the roller and the shutter so that the backward movement of the roller will operate only upon the portion which lies upon the platen. Thus the tension placed upon the webs by the rollers will operate to take out all slack existing in the platen supported portions and will at the same time bring about any slight rearward motion necessary to bring the forward edge of each aperture against the hook and thus align the correspondingly spaced printed forms on the superposed webs. After such a rearward adjustment the knife 35 is lowered to clamp the webs together. Thus an additional function of pressing the sheets into intimate contact is performed, with the result that all air pockets between the superposed webs are removed. Notable advantages resulting from this lie in the greater degree of perfection in printing the several copies legibly, both from the stand point of the clean cut heavy impression produced as well as in the total elimination of any tendency for the type of the typewriter to stencil cut through the material of the web.

Figure 3:
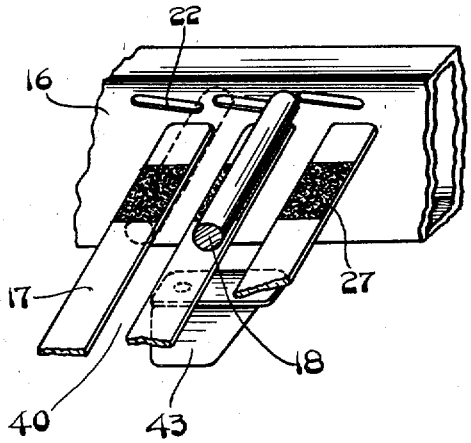
Fig. 3 is an enlarged fragmental perspective view of a portion of the apparatus shown in Fig. 2.
Figure 2:
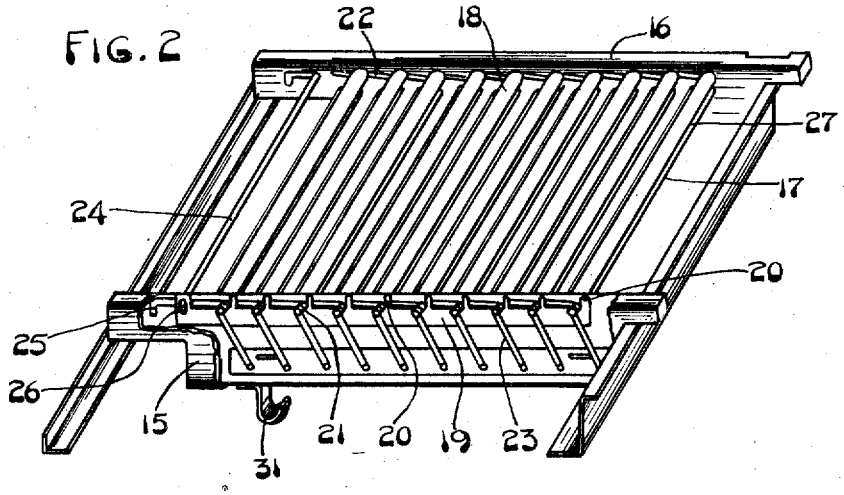
Fig. 2 is an enlarged perspective view, partially in fragmental section, of the main portion of the invention.

Should a roll of stationery, such as has been shown, embody certain webs which are of a less width than others of the webs, in which event perhaps but one of the aligning hooks 32 or 33 are employed, but one side bar 15 or 16, would perhaps be used as a guide for such narrow webs. In order, therefore, to provide for the holding of such narrow webs in the proper position, a small guide plate 43 may be secured, as for example beneath the slat over which the narrow web is to pass, as shown in Fig. 3.

And now, the purpose of the raised spots 27 of the slats will be described. In all paper stock, and particularly in paper stock of certain grades, there exists considerable bulging or buckling. This is occasioned by the fact that in the making of such paper the quality, weight, and consequent thickness of the web will vary in spots. Sometimes these inequalities occur at intervals along one edge of a web and sometimes along both edges, while frequently they are just as likely to occur at points between the edges. In such an event any attempt to pass defective webs of this nature between a flat surface, such as one of the slats 17, and a straight surface, such as one of the rollers 18, would create a wrinkled web which would result in imperfect copies, misalgnment and possible tearing or crumpling of one or more of the superposed platen supported portions of the webs. However, if such a buckled or edge stretched web be held at points widely separated, so as to allow of freedom of the remainder of the web between these points to find its own position, there can be no wrinkling, crumpling, tearing or imperfect copy work produced on the superposed webs. Such a condition is brought about by the provision of the raised spots 27 of the slats.

It will now be assumed that the device is in condition to operate and that the webs have been so positioned that their superposed printed forms are all in perfect registration. The first thing for the operator to do would be to operate the typewriter in order to fill in the printed forms with the desired data. After this has been done the knife 35 is raised and the forward edges of the webs are grasped, a notch 44, see Fig. 5, having been provided to enable the operator to take hold of the webs easily. The assembled webs are then drawn forwardly until the next set of approximately aligned apertures 34 are reached. These apertures are then placed over the hooks and the webs are released. The first action produced when the webs are drawn forwardly is to cause rollers 18 to be moved forwardly in their mounting slots 22, against the tension of springs 23, until they have passed beyond slats 17, or, at least, until the snubbing or gripping action of the rollers in their respective slots upon the webs, has been relieved to permit the webs to be fed from the roll 12. At this point it may be well to digress sufficiently to refer to the manner in which the unwinding from the roll is brought about. In accordance with the provisions of the invention involved in the use of roll stationery of this type, the forward web 39 is the only web upon which tension is exerted to unwind or propel the roll, the remaining webs being permitted to seek their own positions in increasingly draped condition, as shown in Fig. 1, so that the action, which will now be described, may be carried out without hindrance. When the web apertures have been placed over the hooks 32 and 33 the webs are released. The rollers have been drawn forwardly, as has been described, and will now exert a backward pull upon the released webs and bring about a snubbing or gripping of the webs between the rollers and cooperating slots. The result of this is to cause the platen supported portions of the web to be drawn backwardly so that the front walls of the apertures engage the hooks and through this adjustment of the webs bring about realignment or proper registration of the several superposed printed forms of the next series to be filled. The knife 35 is now lowered into clamping engagement with the webs and the filled in form-printed portions which have been drawn to the front and beyond the platen are then torn off over the knife edge. The device is now in condition for the repeated operation of the typewriter.

Among additional advantages to be obtained by the device just described is the fact that accurately measured delivery is rendered possible. Another advantage which lies in the clamping and taut holding of the superposed rolled webs is that all humps and other unevenness, such as would occur in folded forms of stationery is overcome, thus resulting in uniformity of copy work, perfect printing, and correct alignment of printed forms. Another advantage attained by the improved device just described, lies in the elimination of friction by reason of the two point gripping of the webs upon the spots 27 of the slats. Friction on the hand pulling operation is thus overcome in this manner. Further advantage may be mentioned in the provision of the aligning feature in conjunction with the clamping of the webs by the knife. This assures that exact parallelism of the webs is secured and that for this reason the cutting edge of the knife will always be at right angles to the sides of the webs, thus causing right angle cutting of the webs over the cutter blade at each cutting or tearing operation.

Having thus described the invention what is claimed is:

1. In a manifolding machine having a platen adapted to receive and support a series of webs from a source of supply, a series of rollers over each of which one of the webs is adapted to be drawn before its passage to the platen, a series of slats corresponding in number to the number of rollers, with each of the slats designed for cooperation with but one of the rollers, means for mounting said rollers for movement at an angle to the surface of the slats and cause movement thereof toward and away from the slats, movement away from the slats being caused by the webs in their passage over the platen from the source of supply, and separate means adapted to be brought into action functioning the movement of said rollers toward the slats upon cessation of forward movement of the webs.

2. In a manifolding machine having a platen adapted to receive and support a series of webs from a source of supply, a series of rollers over each of which one of the webs is adapted to be drawn before its passage to the platen, a series of slats corresponding in number to the number of rollers, with each of the slats designed for cooperation with but one of the rollers, means for mounting said rollers for movement at an angle to the surface of the slats thus causing movement thereof toward and away from the slats, movement away from the slats being caused by the webs in their passage over the platen from the source of supply, and separate means adapted to be brought into action functioning the movement of said rollers toward the slats upon cessation of forward movement of the webs, and means adapted to arrest reverse movement of the webs in response to the last mentioned movement of the rollers, whereby the webs are held taut upon the platen.

3. In a manifolding machine having a platen adapted to receive and support a series of webs from a source of supply, a series of rollers over each of which one of the webs is adapted to be drawn before its passage to the platen, a series of slats corresponding in number to the number of rollers, and relatively stationary to the rollers, with each of the slats designed for cooperation with but one of the rollers, means for mounting said rollers for movement at an angle to the surface of the slats thus causing movement thereof toward and away from the slats, movement away from the slats being caused by the webs in their passage over the platen from the source of supply, and separate means adapted to be brought into action functioning the movement of said rollers toward the slats upon cessation of forward movement of the webs.

4. In a manifolding machine for operation on a series of webs and having a platen adapted to receive and support the webs as they are fed from their source of supply, a series of rollers over each of which one of the webs is adapted to be drawn before its passage to the platen, a series of slats corresponding in number to the number of rollers, with each of the slats designed for cooperation with but one of the rollers, means for mounting said rollers for movement at an angle to the surface of the slats thus causing movement thereof toward and away from the slats, movement away from the slats being caused by the webs in their passage over the platen from the source of supply, and separate means adapted to be brought into action functioning the movement of said rollers toward the slats upon cessation of forward movement of the webs, said webs during said roller movement being engaged thereby with the slats to maintain a check upon their feed from the source of supply, but upon passage of the rollers from the slats to restore freedom of feed from the source of supply.

5. In a manifolding machine for operation on a series of webs and having a platen adapted to receive and support the webs as they are fed from their source of supply, a series of rollers over each of which one of the webs is adapted to be drawn before its passage to the platen, a series of slats corresponding in number to the number of rollers, with each of the slats designed for cooperation with but one of the rollers, means for mounting said rollers for movement at an angle to the surface of the slats thus causing movement thereof toward and away from the slats, movement away from the slats being caused by the webs in their passage over the platen from the source of supply, and separate means adapted to be brought into action functioning the movement of said rollers toward the slats upon cessation of forward movement of the webs, said webs during said roller movement being engaged thereby with the slats to maintain a check upon their feed from the source of supply, but upon passage of the rollers from the slats to restore freedom of feed from the source of supply, and means adapted to arrest movement of the platen supported portions of the webs upon said separate means being brought into action.

6. In combination in a web aligning and tensioning device, a supply for a plurality of webs, and automatic tensioning and clamping means for individual tensioning of the webs, and clamping them, comprising a slat and roller for each web and between which the web is located, said roller being movable toward and away from the slat, and spots on the slat for gripping the web at points between its edges when the roller moves to cooperate with the slat.

7. In mechanism comprising a stand having a platen mounted therein and having supporting-arms extending rearwardly from the platen and fixed pins in front of the platen, a unit mounted between said supporting-arms comprising bars fixedly supported by said arms provided with slots, transverse slats connecting said bars in a plane below said slots, yieldingly-held normally retracted web-tensioning rollers overlying said slats and having their ends engaging said slots, a source from which webs may be led upwardly over the front edges of the slats and thence under and about the rollers and forwardly over the platen, said rollers yielding to permit the webs to be drawn forwardly over the platen and then returning to normal web-tensioning position, and manually actuated means serving to shift said rollers away from said slats.

8. In mechanism comprising a stand having a platen mounted therein and having stationary supporting-arms extending rearwardly from the platen: a unit mounted between said supporting-arms comprising stationary bars supported on said arms provided with forwardly and upwardly inclined slots, transverse slats connecting said bars in a plane beneath said slots, and normally retracted web-tensioning rollers overlying said slats and having their ends mounted to travel in said slots.

9. In combination with the unit specified in claim 8 a manual device adapted to simultaneously shift said rollers away from said slats.

10. In connection with a stand equipped with a platen and in front thereof with fixed web-engaging pins and having supporting-arms extending rearwardly from the platen, a unit mounted between said arms comprising bars provided with inclined slots, transverse slats connecting said bars in a plane below said slots, web-tensioning rollers journalled in said slots and overlying said slats, and springs yieldingly holding said rollers in retracted position.

11. In combination with the unit specified in claim 10, manually actuated means comprising bars connected with the ends of said rollers and means for simultaneously shifting said bars to move said rollers away from said slats.

12. In means of the character set forth, a unit comprising bars provided with inclined slots, web-snubbing and tensioning rollers mounted in said slots, and transverse slats underlying said rollers and connecting said bars.

13. In combination: a stand carrying a platen and having web-engaging pins in front of said platen and spaced supporting-arms back of the platen, a manually actuated clamping-member having perforations accommodating said pins and having also a tearing edge, and a unit carried by said arms comprising web-snubbing slats and traveling web-snubbing and tensioning rollers coacting with said slats.

14. In means of the character set forth, a pair of supporting-arms, a series of transverse slats between said arms, a series of coacting traveling tensioning rollers, and manual means for moving said rollers to open the spaces between them and the slats.

BLANTON M. BOYD.